United States Patent
Olivier et al.

(10) Patent No.: US 11,062,432 B2
(45) Date of Patent: Jul. 13, 2021

(54) METHOD AND DEVICE FOR RECONSTRUCTING AN HDR IMAGE

(71) Applicant: INTERDIGITAL VC HOLDINGS, INC., Wilmington, DE (US)

(72) Inventors: Yannick Olivier, Thorigne Fouillard (FR); Edouard Francois, Bourg des Comptes (FR); Pierre Andrivon, Liffre (FR); David Touze, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 62 days.

(21) Appl. No.: 16/488,574

(22) PCT Filed: Feb. 19, 2018

(86) PCT No.: PCT/EP2018/053987
§ 371 (c)(1),
(2) Date: Aug. 23, 2019

(87) PCT Pub. No.: WO2018/153802
PCT Pub. Date: Aug. 30, 2018

(65) Prior Publication Data
US 2020/0219236 A1 Jul. 9, 2020

(30) Foreign Application Priority Data
Feb. 24, 2017 (EP) .................................. 17305207

(51) Int. Cl.
*G06T 5/00* (2006.01)
*G06T 3/40* (2006.01)
(Continued)

(52) U.S. Cl.
CPC ................ *G06T 5/007* (2013.01); *G06T 3/40* (2013.01); *G06T 5/50* (2013.01); *G06T 9/00* (2013.01);
(Continued)

(58) Field of Classification Search
CPC .... H04N 5/2355; H04N 5/2356; H04N 19/70; H04N 19/85; H04N 9/64; H04N 1/6058;
(Continued)

(56) References Cited

U.S. PATENT DOCUMENTS

| 8,248,486 | B1 * | 8/2012 | Ward ....................... H04N 1/60 348/223.1 |
| 9,412,156 | B2 * | 8/2016 | Ward ..................... H04N 19/98 |

(Continued)

FOREIGN PATENT DOCUMENTS

| CN | 104364820 A | 2/2015 |
| CN | 105393525 A | 3/2016 |

(Continued)

OTHER PUBLICATIONS

Lasserre et al. "Technicolor's response to CfE for HDR and WCG (category 1)—Single layer HDR video coding with SDR backward compatibility", International Organisation for Standardisation, Coding of Moving Pictures and Audio, ISO/IEC JTC1/SC29/WG11 MPEG2014/M36263r1, Warsaw, Poland, Jun. 2015, 21 pages.

(Continued)

Primary Examiner — Sean T Motsinger
(74) Attorney, Agent, or Firm — Invention Mine LLC

(57) ABSTRACT

The present principles relates to a method and device for reconstructing an High-Dynamic-Range image represented by one reconstructed High-Dynamic-Range luma component ($\hat{Y}'$) and two reconstructed High-Dynamic-Range chroma components ($\hat{U}'$, (I)) from a Standard-Dynamic-Range image represented by a Standard-Dynamic-Range luma component (y', y'$_1$) and two Standard-Dynamic-Range chroma components (u', v'). The method is characterized in that the method comprises: inverse-mapping (22) said Standard-Dynamic-Range luma component (y', y'$_1$) to obtain said reconstructed High-Dynamic-Range luma component (Continued)

($\hat{Y}'$); and correcting (33) said two Standard-Dynamic-Range chroma components (u', v') to obtain said two reconstructed High-Dynamic-Range chroma components ($\hat{U}'$, ($\hat{I}$)) according to said Standard-Dynamic-Range luma component (y', $y'_1$) and said reconstructed High-Dynamic-Range luma component ($\hat{Y}'$).

14 Claims, 7 Drawing Sheets

(51) Int. Cl.
  *G06T 5/50* (2006.01)
  *G06T 9/00* (2006.01)
  *H04L 29/06* (2006.01)
(52) U.S. Cl.
  CPC ............ *H04L 65/607* (2013.01); *H04L 65/80* (2013.01); *G06T 2207/10024* (2013.01); *G06T 2207/20208* (2013.01)
(58) Field of Classification Search
  CPC ..... G06T 5/007–009; G06T 5/50; G06T 3/40; G06T 9/00; G06T 2207/10024; G06T 2207/20208; H04L 65/607; H04L 65/80
  See application file for complete search history.

(56) References Cited

U.S. PATENT DOCUMENTS

| | | | | |
|---|---|---|---|---|
| 2007/0201560 | A1* | 8/2007 | Segall | H04N 19/85 375/240.24 |
| 2008/0192819 | A1* | 8/2008 | Ward | H04N 19/98 375/240.02 |
| 2012/0281009 | A1* | 11/2012 | Ward | H04N 5/2355 345/589 |
| 2013/0064462 | A1* | 3/2013 | Ninan | H04N 19/60 382/233 |
| 2016/0360212 | A1 | 12/2016 | Dai et al. | |
| 2017/0142446 | A1* | 5/2017 | Leleannec | H04N 19/196 |
| 2018/0249182 | A1* | 8/2018 | Andrivon | H04N 19/44 |
| 2019/0130546 | A1* | 5/2019 | Le Naour | H04N 19/86 |
| 2019/0156468 | A1* | 5/2019 | Olivier | G06T 5/009 |
| 2019/0164262 | A1* | 5/2019 | Cellier | G06T 5/009 |
| 2020/0219236 | A1* | 7/2020 | Olivier | H04L 65/607 |
| 2020/0296428 | A1* | 9/2020 | Andrivon | G06T 5/009 |

FOREIGN PATENT DOCUMENTS

| | | |
|---|---|---|
| CN | 105850128 A | 8/2016 |
| WO | 2016120209 A1 | 8/2016 |
| WO | 2016120354 A1 | 8/2016 |
| WO | WO 2016120108 A1 | 8/2016 |

OTHER PUBLICATIONS

Anonymous, "High Dynamic Range Electro-Optical Transfer Function of Mastering Reference Displays", Society of Motion Picture and Television Engineers, SMPTE ST 2084:2014, Aug. 16, 2014, pp. 1-15.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2015, pp. 1-634.

Anonymous, "Advanced video coding for generic audiovisual services", International Telecommunication Union Standard, ITU-T H.264, Series H: Audiovisual and Multimedia Systems, Infrastructure of audiovisual services—coding of moving video, Jan. 2012, pp. 1-680.

Pouli et al., "Color Correction for Tone Reproduction", CIC21: Twenty-first Color Imaging Conference, Albuquerque, New Mexico, USA, Nov. 4, 2103, pp. 215-220.

Diaz, R., et al. "Integrating HEVC video compression with a high dynamic range video pipeline" SMPTE Motion Imaging Journal, 2016 pp. 14-21.

"High-Performance Single Layer Directly Standard Dynamic Range (SDR) Compatible High Dynamic Range (HDR) System for use in Consumer Electronics devices (Sl-HDR1)", European Telecommunications Standards Institute ETSI TS 103 433 V1.1.1 (Aug. 2016) pp. 1-84.

* cited by examiner

METHOD AND DEVICE FOR RECONSTRUCTING AN HDR IMAGE

This application claims the benefit, under 35 U.S.C. § 365 of International Application PCT/EP2018/053987, filed Feb. 19, 2018, which was published in accordance with PCT Article 21(2) on Aug. 30, 2018, in English, and which claims the benefit of European Patent Application No. 17305207.7, filed on Feb. 24, 2017.

1. FIELD

The present principles generally relate to image/video decoding. Particularly, but not exclusively, the technical field of the present principles are related to coding and reconstructing of an image whose pixels values belong to a high-dynamic range.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, an image contains one or several arrays of samples (pixel values) in a specific image/video format which specifies all information relative to the pixel values of an image (or a video) and all information which may be used by a display and/or any other device to visualize and/or decode a image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Standard-Dynamic-Range images (SDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values representing luminance levels are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

The arrival of the High Efficiency Video Coding (HEVC) standard (ITU-T H.265 Telecommunication standardization sector of ITU (October 2014), series H: audiovisual and multimedia systems, infrastructure of audiovisual services—coding of moving video, High efficiency video coding, Recommendation ITU-T H.265) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February 2016, pp 14-21).

SDR backward compatibility with decoding and rendering devices is an important feature in some video distribution systems, such as broadcasting or multicasting systems.

Dual-layer coding is one solution to support this feature. However, due to its multi-layer design, this solution is not adapted to all distribution workflows.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for coding an High-Dynamic-Range image represented by one High-Dynamic-Range luma component and two High-Dynamic-Range chroma components. The method further comprises:
  mapping said High-Dynamic-Range luma component to a Standard-Dynamic-Range luma component in order to reduce the dynamic range of the values of said High-Dynamic-Range luma component;
  inverse-mapping said Standard-Dynamic-Range luma component to a reconstructed High-Dynamic-Range luma component;
  correcting said two High-Dynamic-Range chroma components to obtain two Standard-Dynamic-Range chroma components according to said Standard-Dynamic-Range luma component and said reconstructed High-Dynamic-Range luma component; and
  encoding said Standard-Dynamic-Range luma component and said two Standard-Dynamic-Range chroma components.

According to another of their aspects, the present principles further relate to a device for coding an High-Dynamic-Range image represented by one High-Dynamic-Range luma component and two High-Dynamic-Range chroma components. The device further comprises means for:
  mapping said High-Dynamic-Range luma component to a Standard-Dynamic-Range luma component in order to reduce the dynamic range of the values of said High-Dynamic-Range luma component;
  inverse-mapping said Standard-Dynamic-Range luma component to a reconstructed High-Dynamic-Range luma component;
  correcting said two High-Dynamic-Range chroma components to obtain two Standard-Dynamic-Range chroma components according to said Standard-Dynamic-Range luma component and said reconstructed High-Dynamic-Range luma component; and encoding said Standard-Dynamic-Range luma component and said two Standard-Dynamic-Range chroma components.

According to an embodiment, correcting the two High-Dynamic-Range chroma components comprises dividing the two Standard-Dynamic-Range chroma components by a scaling function that depends on the ratio of said reconstructed High-Dynamic-Range luma component over Standard-Dynamic-Range luma component.

According to an embodiment, information data relative to the inverse-mapping of said Standard-Dynamic-Range luma component are encoded into a bitstream as metadata.

According to an embodiment, said Standard-Dynamic-Range luma component is adjusted according to said two Standard-Dynamic-Range chroma components before being encoded.

According to another of their aspects, the present principles relate to a method for reconstructing an High-Dynamic-Range image represented by one reconstructed High-Dynamic-Range luma component and two reconstructed High-Dynamic-Range chroma components from a Standard-Dynamic-Range image represented by a Standard-Dynamic-Range luma component and two Standard-Dynamic-Range chroma components. The method further comprises:

inverse-mapping said Standard-Dynamic-Range luma component to obtain said reconstructed High-Dynamic-Range luma component; and correcting said two Standard-Dynamic-Range chroma components to obtain said two reconstructed High-Dynamic-Range chroma components according to said Standard-Dynamic-Range luma component and said reconstructed High-Dynamic-Range luma component.

According to another of their aspects, the present principles relate to a device for reconstructing an High-Dynamic-Range image represented by one reconstructed High-Dynamic-Range luma component and two reconstructed High-Dynamic-Range chroma components from a Standard-Dynamic-Range image represented by a Standard-Dynamic-Range luma component and two Standard-Dynamic-Range chroma components. The device further comprises means for:

inverse-mapping said Standard-Dynamic-Range luma component to obtain said reconstructed High-Dynamic-Range luma component; and correcting said two Standard-Dynamic-Range chroma components to obtain said two reconstructed High-Dynamic-Range chroma components according to said Standard-Dynamic-Range luma component and said reconstructed High-Dynamic-Range luma component.

According to an embodiment, correcting said two Standard-Dynamic-Range chroma components comprises multiplying the Standard-Dynamic-Range chroma components by a scaling function that depends on the ratio of the reconstructed HDR luma component over the SDR luma component.

According to an embodiment, information data relative to the inverse-mapping of the Standard-Dynamic-Range luma component are decoded from a bitstream in order to defined said inverse-mapping.

According to yet another of their aspects, the present principles relate to a computer program product comprising program code instructions to execute the steps of a above method when this program is executed on a computer.

4. BRIEF DESCRIPTION OF DRAWINGS

In the drawings, examples of the present principles are illustrated. It shows:

Similar or same elements are referenced with the same reference numbers.

5. DESCRIPTION OF EXAMPLE OF THE PRESENT PRINCIPLES

Figure 1:
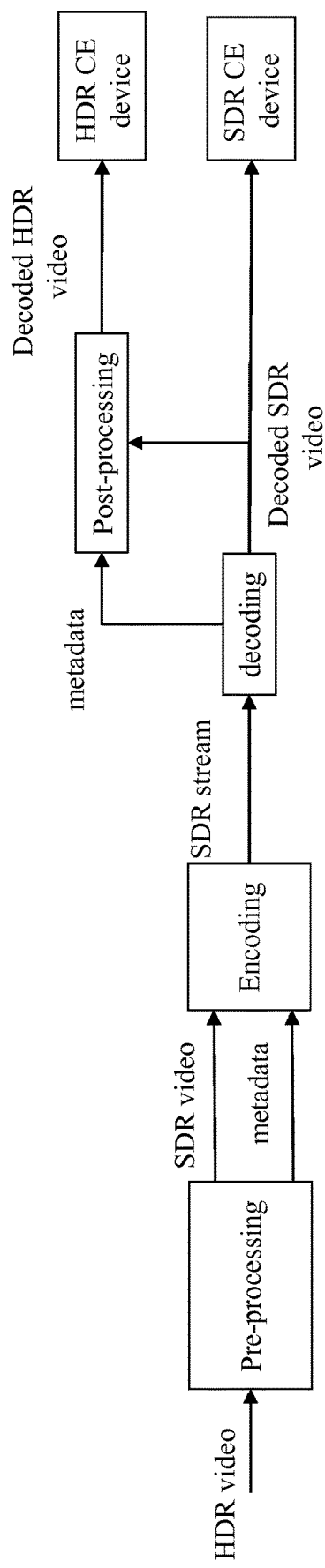
FIG. 1 shows an end-to-end workflow supporting content production and delivery to HDR and SDR displays.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or subcombination.

In the following, the capital symbols, for example (Y,U, V), designate components of an HDR signal, and lower-case symbols, for example (y,u,v), designate components of a SDR signal. Prime symbols, in the following, for example ($Y'=Y^{1/\gamma}, U'=U^{1/\gamma}, V'=V^{1/\gamma}$), designate gamma-compressed components of a HDR signal when those prime symbols are capital symbols and prime symbols, for example (y',u',v'), designate gamma-compressed components of a SDR signal when those prime symbols are lower-case symbols.

The present principles are described for coding/decoding/reconstructing an image but extends to the coding/decoding/reconstructing of a sequence of images (video) because each image of the sequence is sequentially encoded/decoded/reconstructed as described below.

FIG. 1 shows an end-to-end workflow supporting content production and delivery to HDR and SDR displays in accordance with an example of the present principles.

At a pre-processing stage, an incoming HDR video is decomposed in an SDR video and metadata. The SDR video is then encoded with any SDR video codec and an SDR bitstream is carried throughout an existing SDR distribution network with accompanying metadata conveyed on a specific channel or embedded in the SDR bitstream.

Preferably, the video coded is a HEVC codec such as the H265/HEVC codec or H264/AVC ("*Advanced video coding for generic audiovisual Services*", SERIES H: AUDIOVISUAL AND MULTIMEDIA SYSTEMS, Recommendation ITU-T H.264, Telecommunication Standardization Sector of ITU, January 2012).

The metadata are typically carried by SEI messages when used in conjunction with an HEVC or H264/AVC codec such as the HEVC Colour Remapping Information (CRI) or Mastering Display Colour Volume (MDCV) SEI message.

The SDR bitstream is decoded and a decoded SDR video is then available for a SDR Consumer Electronics (CE) display.

Next, at a post-processing stage, which is functionally the inverse of the pre-processing stage, the HDR video is reconstructed from the decoded SDR video and metadata obtained from a specific channel or from the SDR bitstream.

This is a single layer encoding/decoding scheme that is adapted to all distribution workflows because a single SDR stream may be transmitted (including metadata) while allowing backward compatibility with SDR CE devices.

Figure 2A:
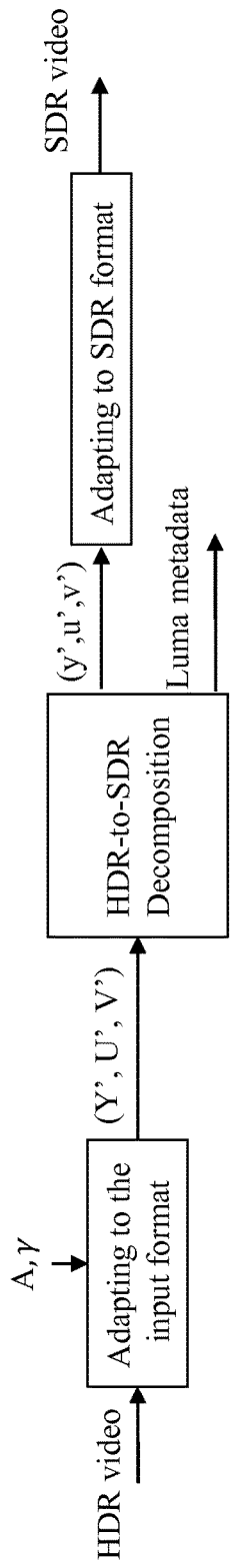
FIG. 2a depicts in more details the pre-processing stage.

FIG. 2a depicts in more details the pre-processing stage.

The core component of the pre-processing stage is the HDR-to-SDR decomposition that generates an SDR video and metadata from the HDR video.

More precisely, the HDR-to-SDR decomposition aims at converting a HDR video represented in a specific input format to a SDR video represented in a specific output format according to the embodiment discloses below but the present principles are not limited to specific input/output color space or gamut.

Optionally, the format of the HDR video, respectively the targeted format of the SDR video, may be adapted to said specific input format, respectively specific output format.

Said input/output format adaptation may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc. Note that the well-known YUV color space refers also to the well-known YCbCr in the prior art.

Said input format adaptation may also comprise deriving a HDR luma component Y' and HDR chroma components U' and V' of an HDR image of the HDR video from a weighted sum of gamma-compressed versions of the color components (R,G,B) of the HDR image.

The HDR luma component Y' may thus be derived as follows:

$$Y' = A_1 \begin{bmatrix} R^{1/\gamma} \\ G^{1/\gamma} \\ B^{1/\gamma} \end{bmatrix} = A_1 \begin{bmatrix} R' \\ G' \\ B' \end{bmatrix} \qquad (1)$$

and the HDR chroma components U' and V' are derived as follows:

$$\begin{bmatrix} U' \\ V' \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix} = \begin{bmatrix} A_2 \\ A_3 \end{bmatrix} \begin{bmatrix} R' \\ G' \\ B' \end{bmatrix} \qquad (2)$$

where $A=[A_1\ A_2\ A_3]^T$ may be the canonical 3×3 RGB-to-YUV conversion matrix (e.g. as specified in ITU-R Rec. BT.2020 or ITU-R Rec. BT.709 depending on the color space), $A_1\ A_2\ A_3$ being 1×3 matrices and γ may be a gamma factor equal to 2.4 for example.

Note, the HDR luma component Y', which is a non-linear signal, is different of the linear luminance component which is usually obtained from the color components of a signal.

Figure 2B:
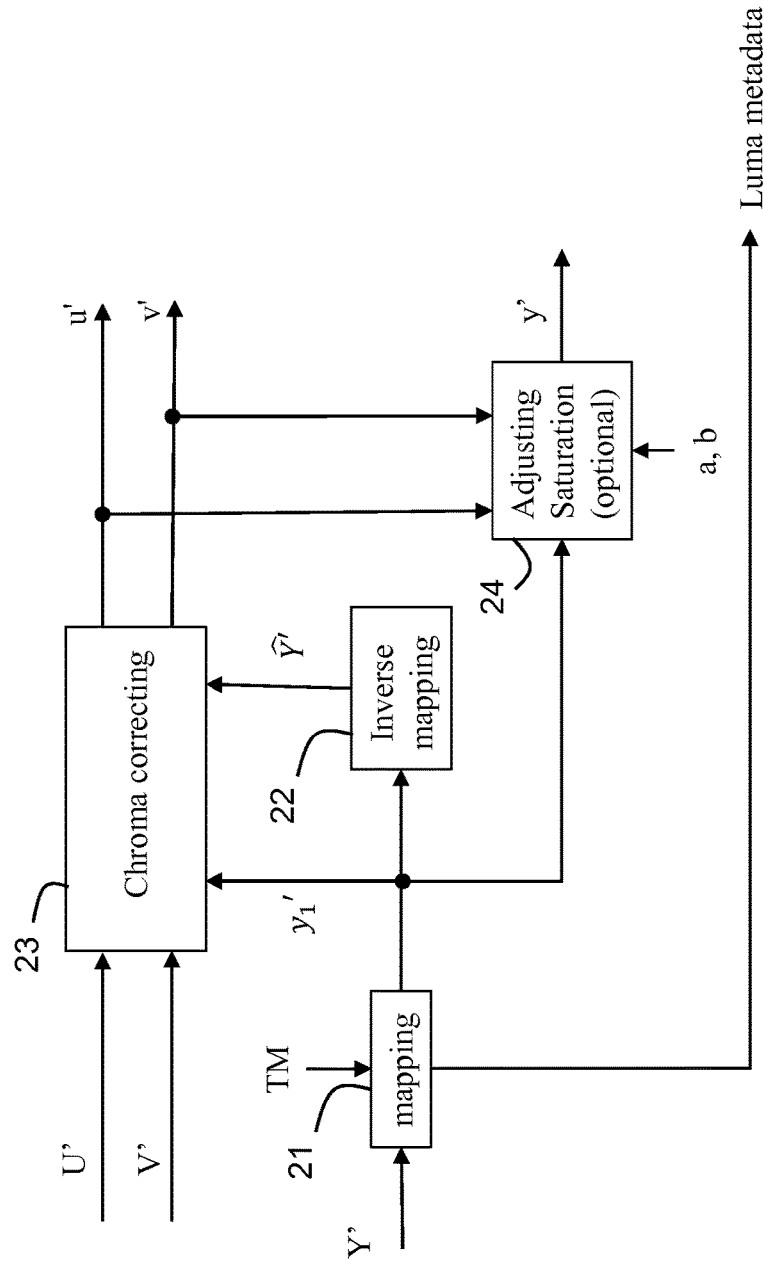
FIG. 2b depicts the HDR-to-SDR decomposition in more details.

FIG. 2b depicts the HDR-to-SDR decomposition of an HDR image of a HDR video. More precisely, a High- Dynamic-Range (HDR) luma component Y' and two HDR chroma components U' and V' are obtained from said HDR image.

A HDR component means an image component whose values are represented with a high number of bits, typically 32-bit or 16-bit. In opposite, a Standard-Dynamic-Range (SDR) component means an image component whose values are represented with a limited number of bits, typically 8-bit or 10-bit.

In step 21, the HDR luma component Y' is mapped to a SDR luma component $y'_1$.

Said mapping is based on a perceptual transfer function TM, whose the goal is to convert a HDR luma component into an SDR luma component, thus reducing the dynamic range of the values of said HDR luma component. The values of a SDR component belong thus to a lower dynamic range than the values of a HDR component.

Said perceptual transfer function TM uses a limited set of control parameters.

The mapping starts by converting an input HDR luma signal (e.g. the HDR luma component Y') to a perceptually-uniform domain using the perceptual transfer function TM.

Figure 2C:
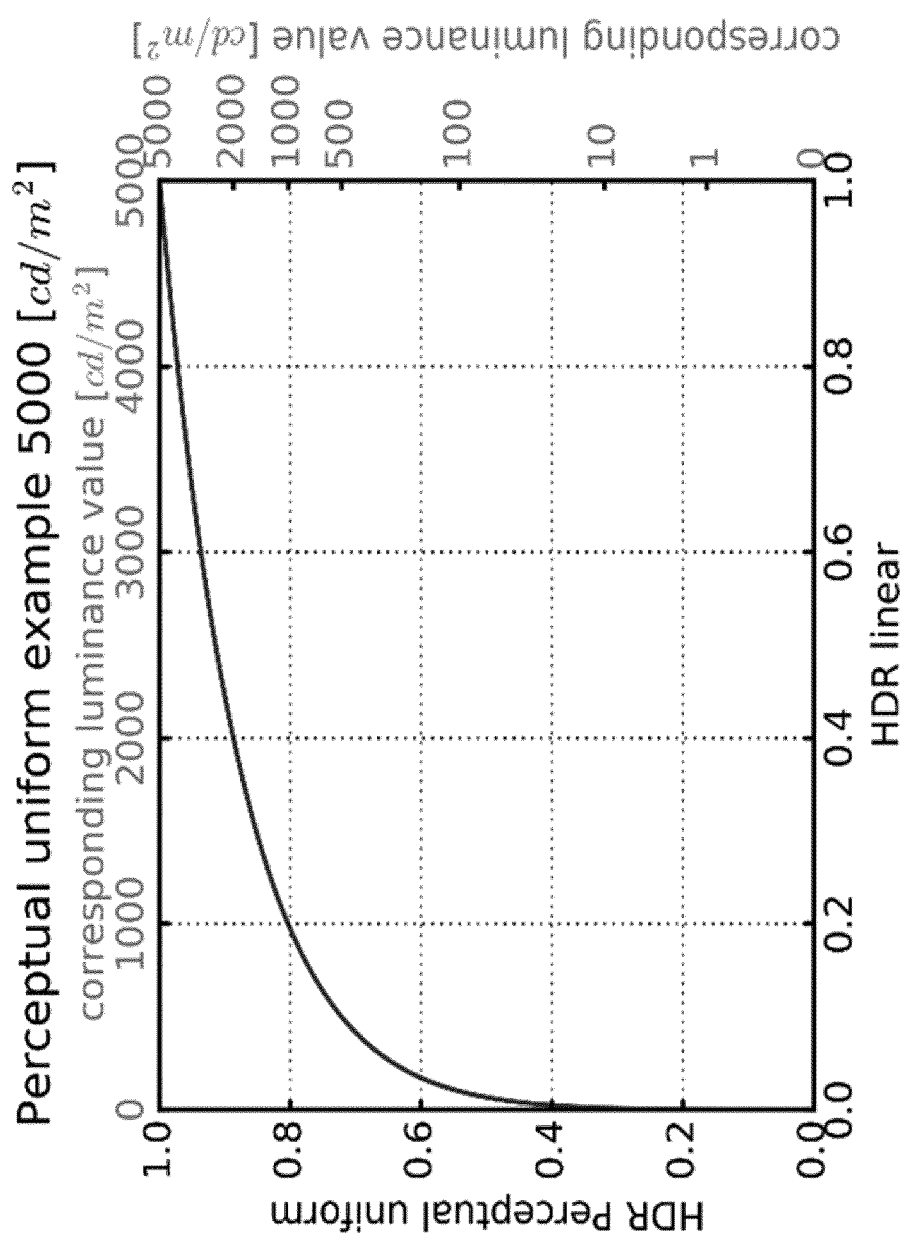
FIG. 2c shows an example of a perceptual transfer function.

FIG. 2C shows an illustration of a perceptual transfer function which may be used for mapping luminance components but a similar perceptual transfer function for mapping luma components may be used.

Figure 2D:
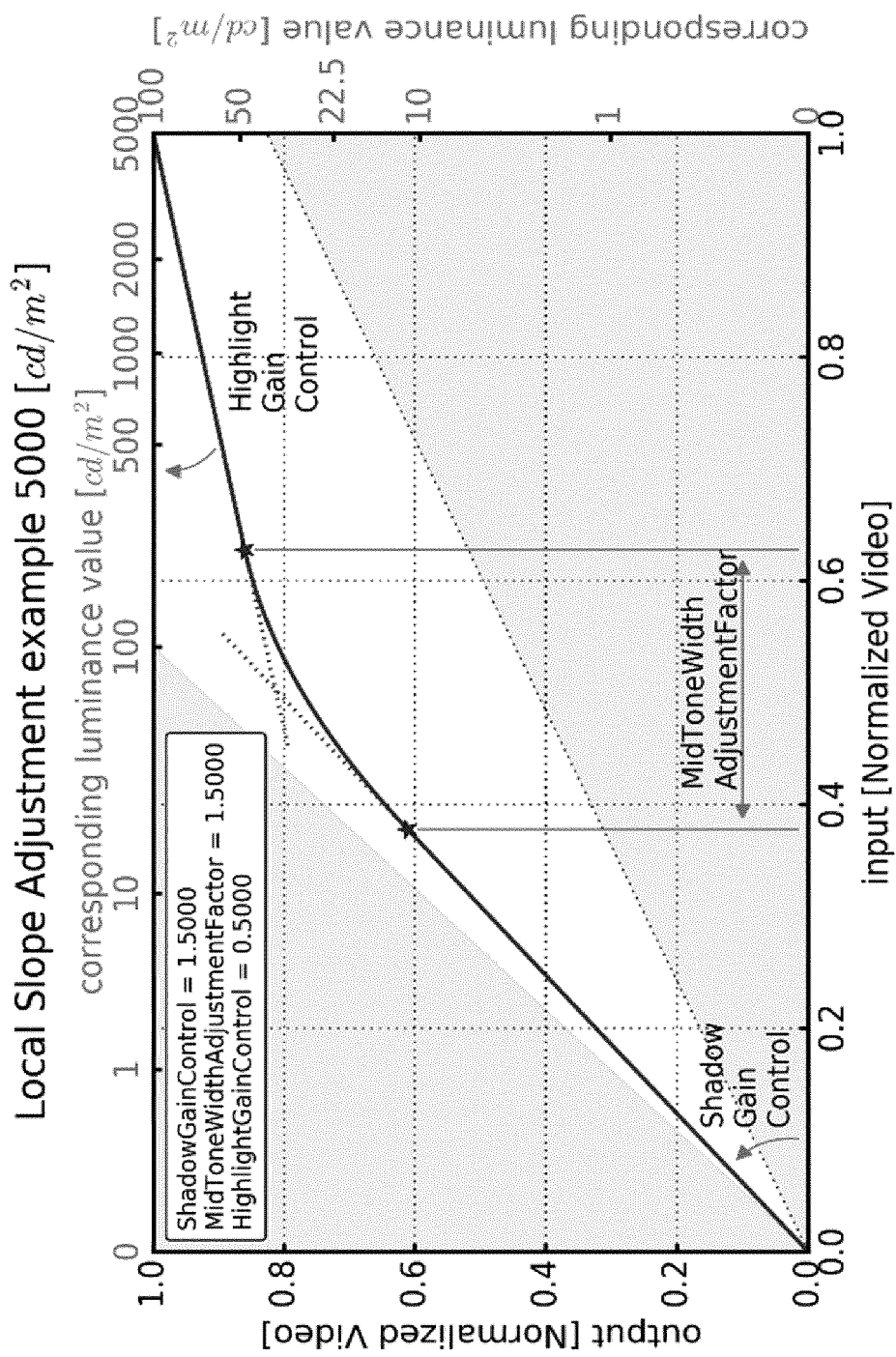
FIG. 2d shows an example of a piece-wise curve used for luma-mapping.

The mapping is controlled by a mastering display peak luminance parameter (equal to 5000 cd/m² in FIG. 2c). To better control the black and white levels, a signal stretching between content-dependent black and white levels is applied. Then the converted signal is mapped using a piece-wise curve constructed out of three parts, as illustrated in FIG. 2d. The lower and upper sections are linear, the steepness being determined by the shadowGain and highlightGain parameters respectively. The mid-section is a parabola providing a smooth bridge between the two linear sections. The width of the cross-over is determined by the midToneWidthAdjFactor parameter.

The SDR luma component $y'_1$ is given by:

$$y'_1 = TM[Y'] \quad (3)$$

All the parameters controlling the mapping may be conveyed as luma metadata for example by using a SEI message as defined in JCTVC-W0133 to carry the SMPTE ST 2094-20 metadata.

In step 22 in FIG. 2b, a reconstructed HDR luma component $\hat{Y}'$ may be obtained by inverse-mapping the SDR luma component $y'_1$:

$$\hat{Y}' = ITM(y'_1) \quad (4)$$

where ITM is the inverse of the perceptual transfer function TM.

Said inverse-mapping (step 22) is a reciprocal of the mapping of step 21.

The dynamic range of the values of the reconstructed HDR luma component are thus increased. The values of the reconstructed component $\hat{Y}'$ belong thus to the dynamic range of the values of the HDR component Y'.

Figure 2E:
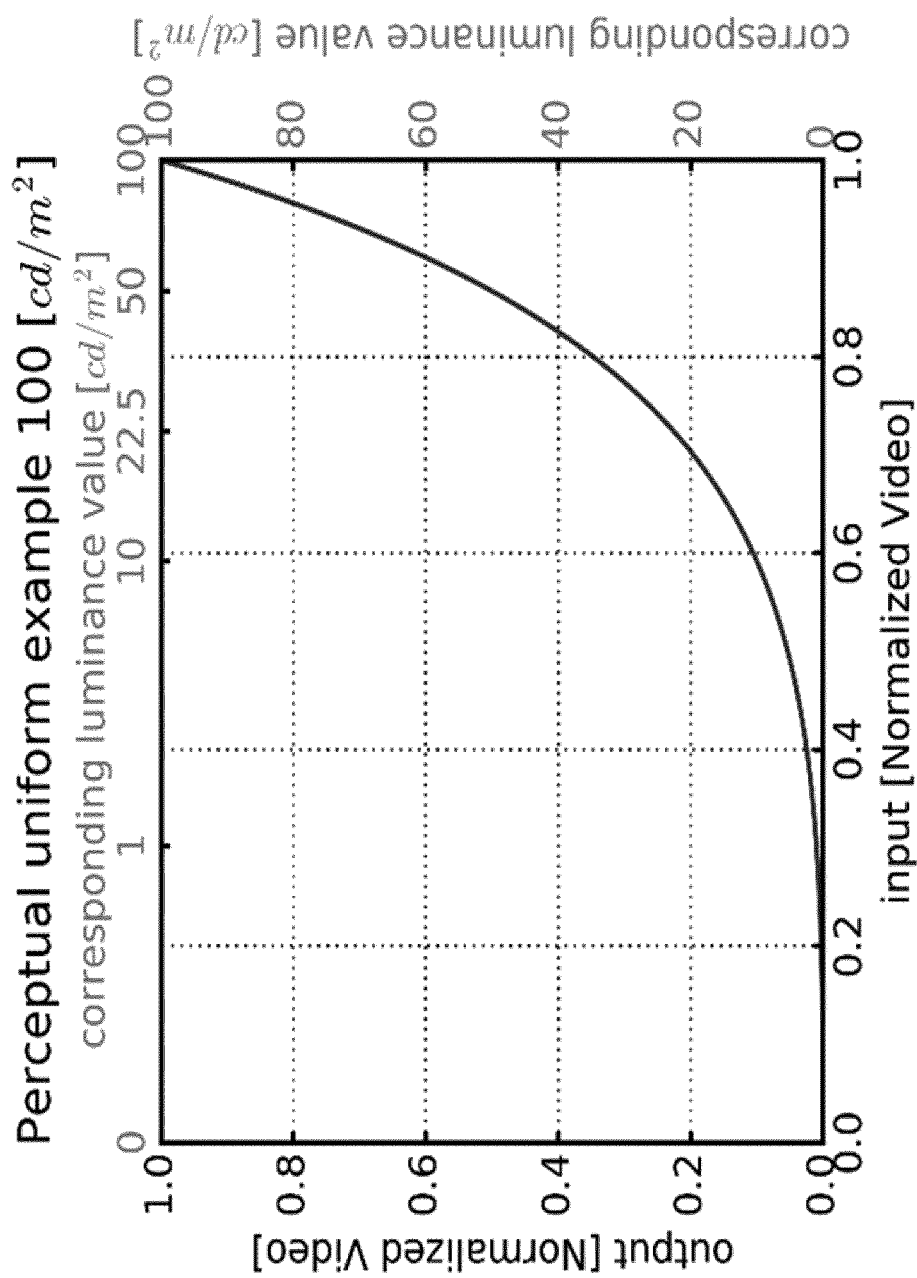
FIG. 2e shows an example of a curve used for converting back a signal to a linear light domain.

FIG. 2e shows an example of the inverse of the perceptual transfer function TM (FIG. 2c) to illustrate how a perceptual optimized video signal may be converted back to the linear light domain based on a targeted SDR display maximum luminance, for example 100 cd/m².

In step 23 in FIG. 2b, two SDR chroma components u', v' are derived by correcting the two HDR chroma components U', V' according to the SDR luma component $y'_1$ and the reconstructed HDR luma component $\hat{Y}'$.

This step 23 allows to control the SDR colors and guarantees their matching to the HDR colors.

The correction of the chroma components may be maintain under control by tuning the parameters of the mapping (inverse mapping). The color saturation and hue are thus under control. Such a control is not possible, usually, when a non-parametric perceptual transfer function is used.

According to an embodiment of step 23, the HDR chroma components U' and V' are divided by a scaling function $\beta(y'_1)$ that depends on the ratio of the reconstructed HDR luma component $\hat{Y}'$ over the SDR luma component $y'_1$.

Mathematically speaking, the two SDR chroma components u', v' are given by:

$$\begin{bmatrix} u' \\ v' \end{bmatrix} = \frac{1}{\beta(y'_1)} * \begin{bmatrix} U' \\ V' \end{bmatrix} \quad (5)$$

where $$\beta(y'_1) = \frac{ITM(y'_1) \cdot \Omega}{y'_1} = \frac{\hat{Y}' \cdot \Omega}{y'_1}$$

and $\Omega$ is constant value depending on the color primaries of the HDR image (equals to 1.3 for BT.2020 for example).

Optionally, in step 24, the SDR luma component $y'_1$ may be adjusted to further control the perceived saturation, as follows:

$$y' = y'_1 - \text{Max}(0, a \times u' + b \times v') \quad (6)$$

where a and b are two control parameters for adjusting the mapping of luma components (also denoted chroma to luma injection parameters). As an example, a=0 and b=0.1.

This step 24 allows to control the SDR colors and to guarantee their matching to the HDR colors. This is in general not possible when using a fixed transfer function. Step 24 may be useful when the SDR image (built from the components u',u',v') is displayed.

The SDR luma and chroma component y' (or $y'_1$), u', v' are outputs of the HDR-to-SDR decomposition and conveyed by a SDR bitstream over a specific channel. The luma metadata are also outputs of the HDR-to-SDR decomposition and may carry, for example, information data relative to the perceptual transfer function TM (step 21) or, equivalently, information data relative to the inverse of the perceptual transfer function TM (step 22). These luma metadata may be conveyed in the SDR bitstream or, alternatively, by another bitstream possibly transmitted over a different channel.

Note that other metadata required by the decoder may also be conveyed by the SDR bitstream or any other bitstream such as metadata relative to the parameters a and b, the definition of the color primaries and/or color gamut.

Figure 3A:
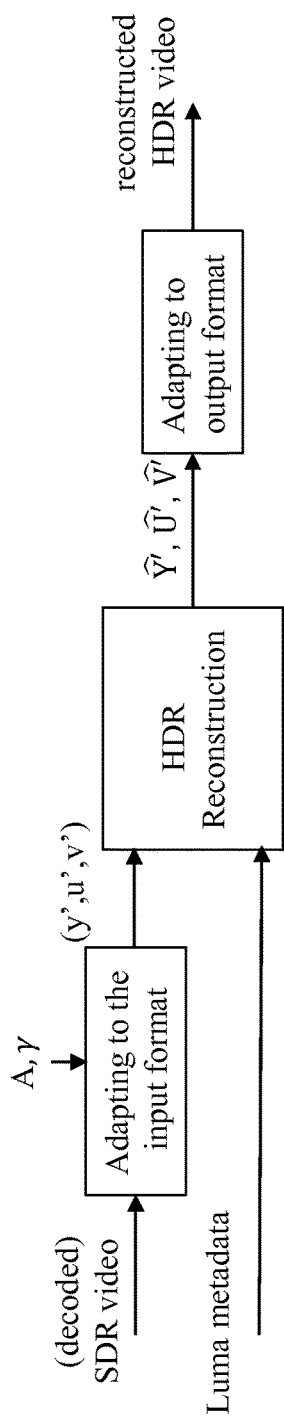
FIG. 3a depicts in more details the post-processing stage.

FIG. 3a depicts in more details the post-processing stage.

The core component of the post-processing stage is the HDR reconstruction that reconstructs an HDR video from a (decoded) SDR video and the luma metadata.

More precisely, the HDR reconstruction aims at converting SDR video represented in a specific input format to an output HDR video represented in a specific output format according to the embodiment discloses below but the present principles are not limited to specific input/output color space or gamut.

Said input or output format adaptation may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc.

Optionally, the format of the reconstructed HDR video may be adapted to a targeted system characteristics (e.g. a Set-Top-Box, a connected TV) and/or an inverse gamut mapping may be used when the decoded SDR video (input of the HDR reconstruction stage) and the reconstructed HDR video (output of the HDR reconstruction stage) are represented in different color spaces and/or gamut.

Said output format adapting may also comprise deriving gamma-compressed color components (R',G',B') of a reconstructed HDR image from a weighted sum of gamma-compressed luma Y' and chroma U', V' components:

$$\begin{bmatrix} R' \\ G' \\ B' \end{bmatrix} = A_1 \begin{bmatrix} Y' \\ U' \\ V' \end{bmatrix} \quad (7)$$

where $A^{-1}$ may be the canonical 3×3 YUV-to-RGB conversion matrix (e.g. BT.2020 or BT.709 depending on the color space).

Said output format adapting may further comprises obtaining color components (R,G,B) from gamma-compressed versions of said color components:

$$\begin{bmatrix} R \\ G \\ B \end{bmatrix} = A^{-1} \begin{bmatrix} R^\gamma \\ G^\gamma \\ B^\gamma \end{bmatrix} \quad (8)$$

where γ may be a gamma factor equal to 2.4 for example.

Figure 3B:
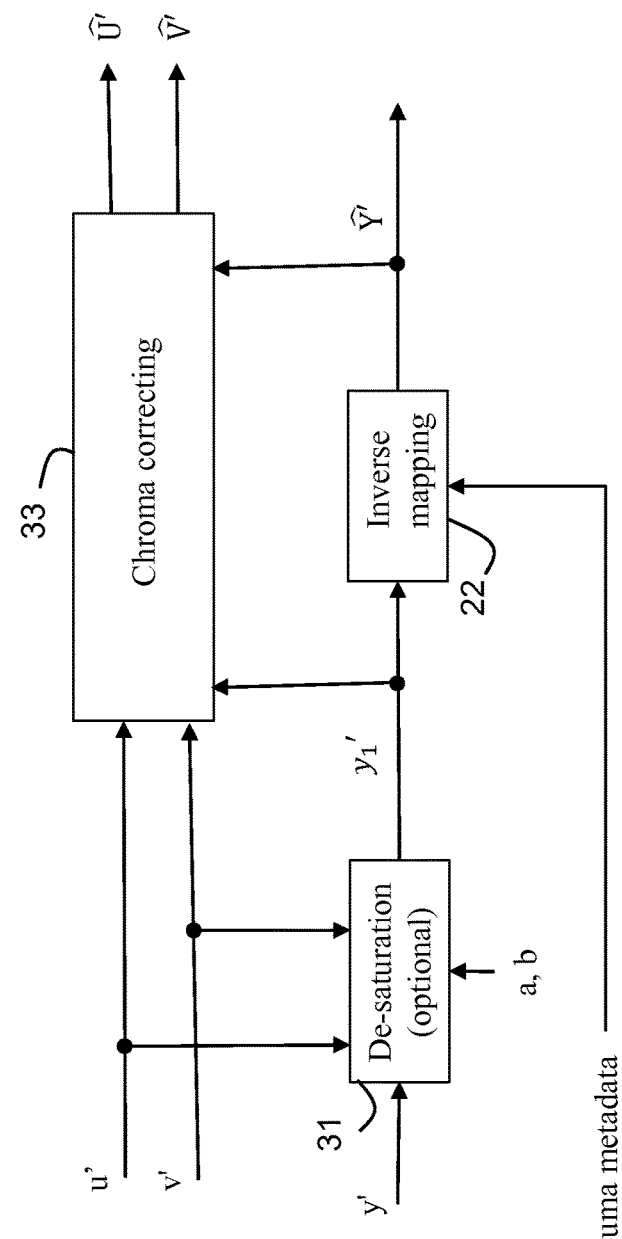
FIG. 3b depicts in more details the HDR reconstruction process.

FIG. 3b depicts in more details the HDR reconstruction process. More precisely, a reconstructed HDR image is formed (obtained) from a reconstructed HDR luma component $\hat{Y}$ and two reconstructed HDR chroma components $\hat{U}'$ and $\hat{V}'$.

The HDR reconstruction is the functional inverse of the HDR-to-SDR decomposition (FIG. 2b).

The SDR luma and chroma component y', u', v' and the luma metadata are obtained, for example from the SDR bitstream and/or from different channels.

Optionally, in step 31, the SDR luma component y' may be desaturated, as follows:

$$y'_1 = y' + \text{Max}(0, a \times u' + b \times v') \quad (9)$$

where a and b are two control parameters for adjusting the mapping as discussed above.

In step 22, the SDR luma component $y'_1$ (or y') is inverse-mapped to the reconstructed HDR luma component $\hat{Y}$ (eq. 4). Said inverse-mapping taking into account the inverse (ITM) of the perceptual transfer function (TM), which may be defined according to the luma metadata.

In step 33, the SDR chroma components (u',v') are corrected to obtain the two reconstructed HDR chroma components $\hat{U}'$ and $\hat{V}'$ according to said SDR luma component $y'_1$ (or y') and said reconstructed HDR luma component $\hat{Y}$.

Said chroma correcting is a reciprocal of the chroma correcting of step 23.

According to an embodiment of step 33, the SDR chroma components (u',v') are multiplied by a scaling function β (.) that depends on the ratio of the reconstructed HDR luma component $\hat{Y}$ over the SDR luma component $y'_1$ (or y').

Mathematically speaking, the two reconstructed HDR chroma components $\hat{U}'$ and $\hat{V}'$ are given by when the SDR luma component $y'_1$ is considered:

$$\begin{bmatrix} \hat{U}' \\ \hat{V}' \end{bmatrix} = \beta(y'_1) \begin{bmatrix} u' \\ v' \end{bmatrix} \quad (10)$$

where $$\beta(y'_1) = \frac{ITM(y'_1) \cdot \Omega}{y'_1} = \frac{\overline{Y_I} \cdot \Omega}{y'_1}$$

and depends on the SDR luma component $y'_1$ and Ω is constant value depending on the color primaries of the HDR image (equals to 1.3 for BT.2020 for example).

Equivalently, when the SDR luma component y' is considered, the two reconstructed HDR chroma components $\hat{U}'$ and $\hat{V}'$ are given by equation (10) in which $y'_1$ is replaced by y'.

On FIG. 1-3b, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 4:
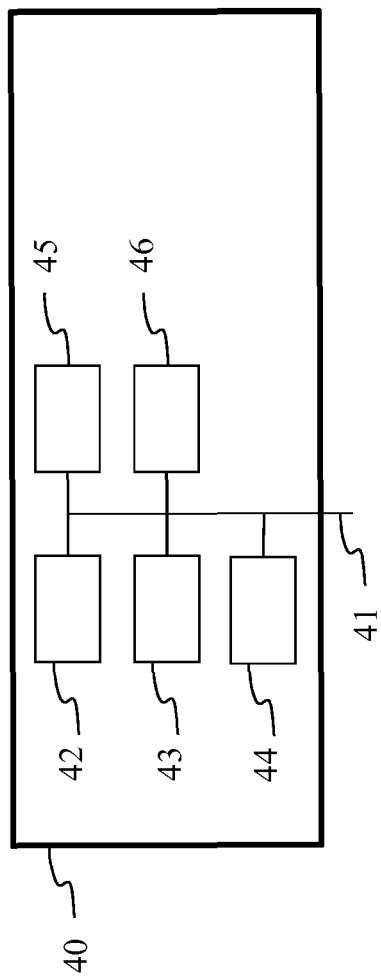
FIG. 4 shows an example of an architecture of a device in accordance with an example of present principles.

FIG. 4 represents an exemplary architecture of a device 40 which may be configured to implement a method described in relation with FIG. 1-3b.

Device 40 comprises following elements that are linked together by a data and address bus 41:
- a microprocessor 42 (or CPU), which is, for example, a DSP (or Digital Signal Processor);
- a ROM (or Read Only Memory) 43;
- a RAM (or Random Access Memory) 44;
- an I/O interface 45 for reception of data to transmit, from an application; and
- battery 46.

In accordance with an example, the battery 46 is external to the device. In each of mentioned memory, the word «register» used in the specification can correspond to area of small capacity (some bits) or to very large area (e.g. whole program or large amount of received or decoded data). The ROM 43 comprises at least a program and parameters. The ROM 43 may store algorithms and instructions to perform techniques in accordance with present principles. When switched on, the CPU 42 uploads the program in the RAM and executes the corresponding instructions.

RAM 44 comprises, in a register, the program executed by the CPU 42 and uploaded after switch on of the device 40, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the HDR video or an HDR image of a HDR video is obtained from a source. For example, the source belongs to a set comprising:
 a local memory (43 or 44), e.g. a video memory or a RAM (or Random Access Memory), a flash memory, a ROM (or Read Only Memory), a hard disk;
 a storage interface (45), e.g. an interface with a mass storage, a RAM, a flash memory, a ROM, an optical disc or a magnetic support;
 a communication interface (45), e.g. a wireline interface (for example a bus interface, a wide area network interface, a local area network interface) or a wireless interface (such as a IEEE 802.11 interface or a Bluetooth® interface); and
 an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded SRD video or decoded HDR video is sent to a destination; specifically, the destination belongs to a set comprising:
 a local memory (43 or 44), e.g. a video memory or a RAM, a flash memory, a hard disk;
 a storage interface (45), e.g. an interface with a mass storage, a RAM, a flash memory, a ROM, an optical disc or a magnetic support;
 a communication interface (45), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
 a display.

In accordance with examples of encoding or encoder, the SDR bitstream and/or the other bitstream carrying the metadata are sent to a destination. As an example, one of these bitstream or both are stored in a local or remote memory, e.g. a video memory (44) or a RAM (44), a hard disk (43). In a variant, one or both of these bitstreams are sent to a storage interface (45), e.g. an interface with a mass storage, a flash memory, ROM, an optical disc or a magnetic support and/or transmitted over a communication interface (45), e.g. an interface to a point to point link, a communication bus, a point to multipoint link or a broadcast network.

In accordance with examples of decoding or decoder, the SDR bitstream and/or the other bitstream carrying the metadata is obtained from a source. Exemplarily, the bitstream is read from a local memory, e.g. a video memory (44), a RAM (44), a ROM (43), a flash memory (43) or a hard disk (43). In a variant, the bitstream is received from a storage interface (45), e.g. an interface with a mass storage, a RAM, a ROM, a flash memory, an optical disc or a magnetic support and/or received from a communication interface (45), e.g. an interface to a point to point link, a bus, a point to multipoint link or a broadcast network.

In accordance with examples, device 40 being configured to implement an encoding method as described above, belongs to a set comprising:
 a mobile device;
 a communication device;
 a game device;
 a tablet (or tablet computer);
 a laptop;
 a still image camera;
 a video camera;
 an encoding chip;
 a still image server; and
 a video server (e.g. a broadcast server, a video-on-demand server or a web server).

In accordance with examples, device 40 being configured to implement a decoding method as described above, belongs to a set comprising:
 a mobile device;
 a communication device;
 a game device;
 a set top box;
 a TV set;
 a tablet (or tablet computer);
 a laptop;
 a display and
 a decoding chip.

Figure 5:
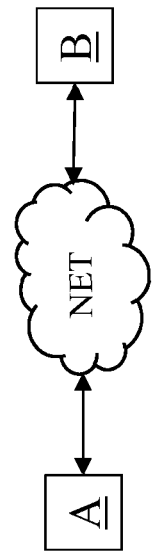
FIG. 5 shows two remote devices communicating over a communication network in accordance with an example of present principles.

According to an example of the present principles, illustrated in FIG. 5, in a transmission context between two remote devices A and B over a communication network NET, the device A comprises a processor in relation with memory RAM and ROM which are configured to implement a method for encoding an image as described above and the device B comprises a processor in relation with memory RAM and ROM which are configured to implement a method for decoding as described above.

In accordance with an example, the network is a broadcast network, adapted to broadcast still images or video images from device A to decoding devices including the device B.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for coding an High-Dynamic-Range image represented by one High-Dynamic-Range luma component and two High-Dynamic-Range chroma components, wherein the method comprises:
   applying a transfer function to said High-Dynamic-Range luma component to obtain a Standard-Dynamic-Range luma component, said transfer function being defined—in order to reduce the dynamic range of the values of said High-Dynamic-Range luma component;
   applying the inverse of the transfer function to said Standard-Dynamic-Range luma component to obtain a reconstructed High-Dynamic-Range luma component;
   correcting said two High-Dynamic-Range chroma components to obtain two Standard-Dynamic-Range chroma components by dividing the two High-Dynamic-Range chroma components by a scaling function that depends on the ratio of said reconstructed High-Dynamic-Range luma component over Standard-Dynamic-Range luma component;
   and
   encoding in a bitstream said Standard-Dynamic-Range luma component and said two Standard-Dynamic-Range chroma components.

2. A device for coding an High-Dynamic-Range image represented by one High-Dynamic-Range luma component and two High-Dynamic-Range chroma components wherein the device comprises at least one processor configured to:
   apply a transfer function to said High-Dynamic-Range luma component to obtain a Standard-Dynamic-Range luma component, said transfer function being defined in order to reduce the dynamic range of the values of said High-Dynamic-Range luma component;
   apply the inverse of the transfer function to said Standard-Dynamic-Range luma component to obtain a reconstructed High-Dynamic-Range luma component;
   correct said two High-Dynamic-Range chroma components to obtain two Standard-Dynamic-Range chroma components by dividing the two High-Dynamic-Range chroma components by a scaling function that depends on the ratio of said reconstructed High-Dynamic-Range luma component over Standard-Dynamic-Range luma component;
   and
   encoding in a bitstream said Standard-Dynamic-Range luma component and said two Standard-Dynamic-Range chroma components.

3. The method of claim 1, wherein said method also comprises steps for encoding into a bitstream as metadata, information data relative to the inverse-mapping of said Standard-Dynamic-Range luma component.

4. The method of claim 1, wherein said method also comprises steps for adjusting said Standard-Dynamic-Range luma component according to said two Standard-Dynamic-Range chroma components before being encoded.

5. A method for reconstructing an High-Dynamic-Range image represented by one reconstructed High-Dynamic-Range luma component and two reconstructed High-Dynamic-Range chroma components from a Standard-Dynamic-Range image represented by a Standard-Dynamic-Range luma component and two Standard-Dynamic-Range chroma components wherein the method comprises:
   applying the inverse of the transfer function to said Standard-Dynamic-Range luma component to obtain said reconstructed High-Dynamic-Range luma component; and
   correcting said two Standard-Dynamic-Range chroma components to obtain said two reconstructed High-Dynamic-Range chroma components by multiplying said Standard-Dynamic-Range chroma components by a scaling function that depends on the ratio of said reconstructed HDR luma component over said SDR luma component.

6. A device for reconstructing an High-Dynamic-Range image represented by one reconstructed High-Dynamic-Range luma component and two reconstructed High-Dynamic-Range chroma components from a Standard-Dynamic-Range image represented by a Standard-Dynamic-Range luma component and two Standard-Dynamic-Range chroma components, wherein the device comprises at least one processor configured to:
- apply the inverse of the transfer function to said Standard-Dynamic-Range luma component to obtain said reconstructed High-Dynamic-Range luma component; and
- correct said two Standard-Dynamic-Range chroma components to obtain said two reconstructed High-Dynamic-Range chroma components by multiplying said Standard-Dynamic-Range chroma components by a scaling function that depends on the ratio of said reconstructed HDR luma component over said SDR luma component.

7. The method of claim 5, wherein said method also comprises steps for decoding from a bitstream information data relative to the inverse-mapping of the Standard-Dynamic-Range luma component in order to define said inverse-mapping.

8. The method of claim 5, wherein said method also comprises steps for adjusting the Standard-Dynamic-Range luma component according to said two Standard-Dynamic-Range chroma components before inverse-mapped.

9. The device of claim 2, wherein said at least one processor is further configured to encoding into a bitstream as metadata, information data relative to the inverse-mapping of said Standard-Dynamic-Range luma component.

10. The device of claim 2, wherein aid at least one processor is further configured to adjusting said Standard-Dynamic-Range luma component according to said two Standard-Dynamic-Range chroma components before being encoded.

11. The device of claim 6, wherein said at least one processor is further configured to decoding from a bitstream information data relative to the inverse-mapping of the Standard-Dynamic-Range luma component in order to define said inverse-mapping.

12. The device of claim 6, wherein said at least one processor is further configured to adjusting the Standard-Dynamic-Range luma component according to said two Standard-Dynamic-Range chroma components before inverse-mapped.

13. A non-transitory computer-readable medium including instructions for causing one or more processors to code an High-Dynamic-Range image represented by one High-Dynamic-Range luma component and two High-Dynamic-Range chroma components, by:
- applying a transfer function to said High-Dynamic-Range luma component to obtain a Standard-Dynamic-Range luma component, said transfer function being defined in order to reduce the dynamic range of the values of said High-Dynamic-Range luma component;
- applying the inverse of the transfer function to said Standard-Dynamic-Range luma component to obtain a reconstructed High-Dynamic-Range luma component;
- correcting said two High-Dynamic-Range chroma components to obtain two Standard-Dynamic-Range chroma components by dividing the two High-Dynamic-Range chroma components by a scaling function that depends on the ratio of said reconstructed High-Dynamic-Range luma component over Standard-Dynamic-Range luma component; and
- encoding in a bitstream said Standard-Dynamic-Range luma component and said two Standard-Dynamic-Range chroma components.

14. A non-transitory computer-readable medium including instructions for causing one or more processors to reconstruct an High-Dynamic-Range image represented by one reconstructed High-Dynamic-Range luma component and two reconstructed High-Dynamic-Range chroma components from a Standard-Dynamic-Range image represented by a Standard-Dynamic-Range luma component and two Standard-Dynamic-Range chroma components, by:
- applying the inverse of the transfer function to said Standard-Dynamic-Range luma component to obtain said reconstructed High-Dynamic-Range luma component; and
- correcting said two Standard-Dynamic-Range chroma components to obtain said two reconstructed High-Dynamic-Range chroma components by multiplying said Standard-Dynamic-Range chroma components by a scaling function that depends on the ratio of said reconstructed HDR luma component over said SDR luma component.

* * * * *